(12) United States Patent
Dumitru et al.

(10) Patent No.: US 8,942,182 B2
(45) Date of Patent: Jan. 27, 2015

(54) ADJUSTABLE DOWNLOAD RATE FOR A PORTABLE ELECTRONIC DEVICE

(75) Inventors: Dan Dumitru, Altanta, GA (US); Rakesh Arora, Burlington (CA); Eshwar Stalin, Atlanta, GA (US)

(73) Assignee: Blackberry Limited, Waterloo (CA)

( * ) Notice: Subject to any disclaimer, the term of this patent is extended or adjusted under 35 U.S.C. 154(b) by 1473 days.

(21) Appl. No.: 11/562,118

(22) Filed: Nov. 21, 2006

(65) Prior Publication Data

US 2008/0119218 A1    May 22, 2008

(51) Int. Cl.
*H04M 1/00* (2006.01)
*H04L 12/58* (2006.01)
*H04L 29/08* (2006.01)
*H04L 12/26* (2006.01)
*H04M 1/725* (2006.01)

(52) U.S. Cl.
CPC ............ *H04L 12/5895* (2013.01); *H04L 51/38* (2013.01); *H04L 67/06* (2013.01); *H04L 43/0888* (2013.01); *H04M 1/72547* (2013.01); *H04M 2250/64* (2013.01)
USPC .......................................... 370/329; 709/218

(58) Field of Classification Search
USPC ................... 709/217–219; 370/329
See application file for complete search history.

(56) References Cited

U.S. PATENT DOCUMENTS

| | | | |
|---|---|---|---|
| 5,845,074 A * | 12/1998 | Kobata | 709/219 |
| 6,023,726 A | 2/2000 | Saksena | |
| 6,275,850 B1 | 8/2001 | Beyda et al. | |
| 6,370,163 B1 * | 4/2002 | Shaffer et al. | 370/519 |
| 6,385,641 B1 | 5/2002 | Jiang et al. | |
| 6,405,192 B1 | 6/2002 | Brown et al. | |
| 6,442,651 B2 | 8/2002 | Crow et al. | |
| 7,039,678 B1 | 5/2006 | Halahmi et al. | |
| 7,277,419 B2 * | 10/2007 | McGowan | 370/345 |
| 7,409,425 B2 | 8/2008 | Naick et al. | |
| 7,624,160 B2 | 11/2009 | Henderson et al. | |
| 7,796,999 B1 * | 9/2010 | Martin et al. | 455/456.1 |
| 2002/0161796 A1 | 10/2002 | Sylthe | |
| 2002/0188728 A1 * | 12/2002 | Ballard | 709/227 |
| 2003/0011631 A1 | 1/2003 | Halahmi | |
| 2003/0012161 A1 * | 1/2003 | Cayla et al. | 370/336 |

(Continued)

FOREIGN PATENT DOCUMENTS

| | | | |
|---|---|---|---|
| EP | 1233594 A1 * | 8/2002 | |
| EP | 1453270 A1 | 9/2004 | |
| EP | 1802055 A1 | 6/2007 | |

OTHER PUBLICATIONS

Luis Lopes, "UMTS Bearer Performance in The Presence of The Synchronisation channel", IEEE 2002, pp. 1-2.*

(Continued)

*Primary Examiner* — Thai Nguyen

(74) *Attorney, Agent, or Firm* — Novak Druce Connolly Bove + Quigg LLP

(57) ABSTRACT

A method for downloading data from a server to a portable electronic device operating on a wireless network includes determining a network speed of the wireless network, setting a chunk size based on the network speed, sending a request to the server including the chunk size and receiving data from the server in chunks having the chunk size.

17 Claims, 4 Drawing Sheets

(56) References Cited

U.S. PATENT DOCUMENTS

| | | | |
|---|---|---|---|
| 2003/0088580 A1 | 5/2003 | Desai et al. | |
| 2003/0093565 A1 | 5/2003 | Berger et al. | |
| 2004/0098495 A1 | 5/2004 | Warren et al. | |
| 2005/0108363 A1 | 5/2005 | Torigoe et al. | |
| 2005/0108636 A1* | 5/2005 | Sylthe et al. | 715/525 |
| 2005/0125720 A1* | 6/2005 | Little et al. | 715/513 |
| 2005/0193068 A1 | 9/2005 | Brown et al. | |
| 2006/0026663 A1 | 2/2006 | Kortum et al. | |
| 2006/0047729 A1 | 3/2006 | Yuan et al. | |
| 2006/0047743 A1 | 3/2006 | Yuan et al. | |
| 2006/0055693 A1 | 3/2006 | Sylthe et al. | |
| 2006/0103665 A1 | 5/2006 | Opala et al. | |
| 2006/0265510 A1* | 11/2006 | Warren et al. | 709/230 |
| 2007/0091789 A1 | 4/2007 | Thukral | |
| 2007/0112973 A1 | 5/2007 | Harris et al. | |
| 2007/0143421 A1 | 6/2007 | Vuong et al. | |
| 2008/0039051 A1 | 2/2008 | Stalin et al. | |

OTHER PUBLICATIONS

Canadian Office Action for related Canadian Application No. 2568815 dated Feb. 21, 2011.

Attachment Service, Research in Motion, 2003, 9 pp.

Canadian Office Action mailed Dec. 6, 2011. In corresponding application No. 2,568,815.

Open Mobile Alliance Ltd.: "Mobile Email Requirements—Candidate Version 1.0" OMA, Oct. 18, 2005, XP002462349.

Liljeberg M et al:"Mowgli WWW software: improved usability of WWW in mobile WAN environments" Global Telecommunications Conference, 1996. Globecome '96. Communications: The Key to Global Prosperity London, UK Nov. 18-22, 1996, New York, NY, USA, IEEE, US, Nov. 18, 1996, pp. 33-37, XP010220169 ISBN: 978-0-7803-3336-9.

Office Action mailed Aug. 8, 2014; in corresponding U.S. Appl. No. 11/562,102.

* cited by examiner

ADJUSTABLE DOWNLOAD RATE FOR A PORTABLE ELECTRONIC DEVICE

FIELD

The present disclosure relates to portable electronic devices operating on wireless networks, in particular, to an adjustable download rate for data transferred to portable electronic devices.

BACKGROUND

On a portable electronic device, the performance of applications that use wireless networks to transfer data is highly dependent on the throughput of the wireless network. The network speeds of older wireless network technologies such as GPRS (General Packet Radio Service), for example, vary significantly from those of more modern wireless networks such as EDGE (Enhanced Data GSM (Global Systems for Mobile) Environment), UMTS (Universal Mobile Telecommunications System) and HSDPA (High Speed Downlink Packet Service), for example.

Typically, the chunk size is a default value that is determined for a specific device type. If the default chunk size is large, devices operating on slower networks will perform poorly. If the default chunk size is small, devices operating on high speed networks will not fully utilize the capability of the network. Therefore, it is desirable to select a chunk size that is suited to the wireless network in order to optimize data transfer.

BRIEF DESCRIPTION OF THE DRAWINGS

The embodiments will be better understood with reference to the following Figures in which like numerals denote like parts and in which.

DETAILED DESCRIPTION

In one aspect there is provided a method for downloading data from a server to a portable electronic device, the method including: determining a network speed of a wireless network on which the portable electronic device is operating, setting a chunk size, the chunk size being determined based on the network speed, sending a request to the server including the chunk size and receiving the data from the server in chunks having the chunk size.

In another aspect there is provided a method for requesting and viewing an attachment of an email message in an attachment viewer of a portable electronic device, the method including: sending a request from the portable electronic device to an attachment server to view the attachment in the attachment viewer, the request including a chunk size for receiving the attachment, building a graph structure within the attachment server representing a map of the attachment and encapsulating the graph structure in an attachment viewer readable format and sending the attachment in the attachment viewer readable format from the attachment server to the portable electronic device, the attachment being received in chunks having the chunk size; wherein the chunk size is determined based on a speed of a wireless network on which the portable electronic device is operating.

In another aspect there is provided a portable electronic device operating on a wireless network, the portable electronic device including: an attachment viewer stored on the portable electronic device, the attachment viewer for requesting to view the attachment and providing a chunk size for receiving the attachment and an attachment server in communication with the attachment viewer, the attachment server for building a graph structure representing a map of the attachment and sending the attachment to the attachment viewer; wherein the chunk size is determined based on a speed of the wireless network.

Figure 1:
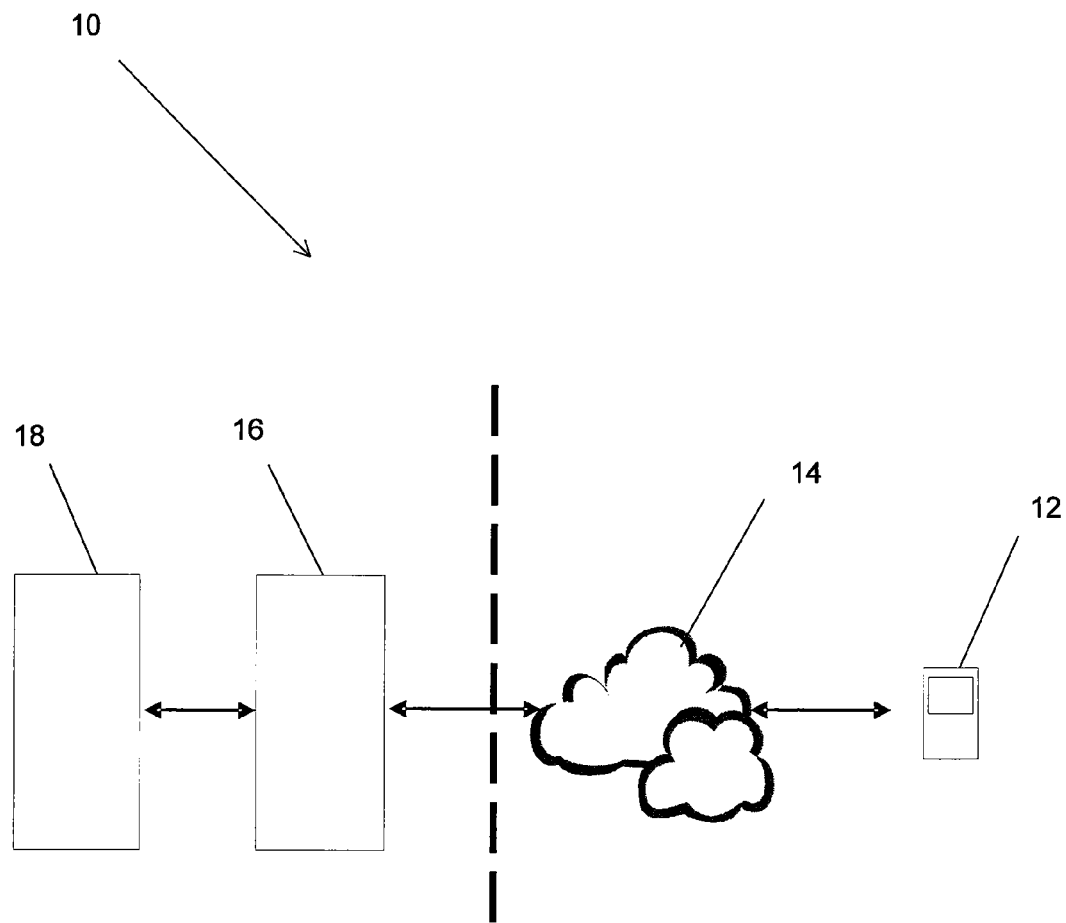
FIG. 1 is a schematic diagram of a wireless communication system.

Referring now to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as an Attachment Server, which communicates with an email client and an Attachment Viewer of the portable electronic device 12 to allow a user to view attachments that are received in email messages. While only one server 18 is shown for illustration purposes, a person skilled in the art will understand that the Attachment Server may alternatively be a separate server.

Figure 2:
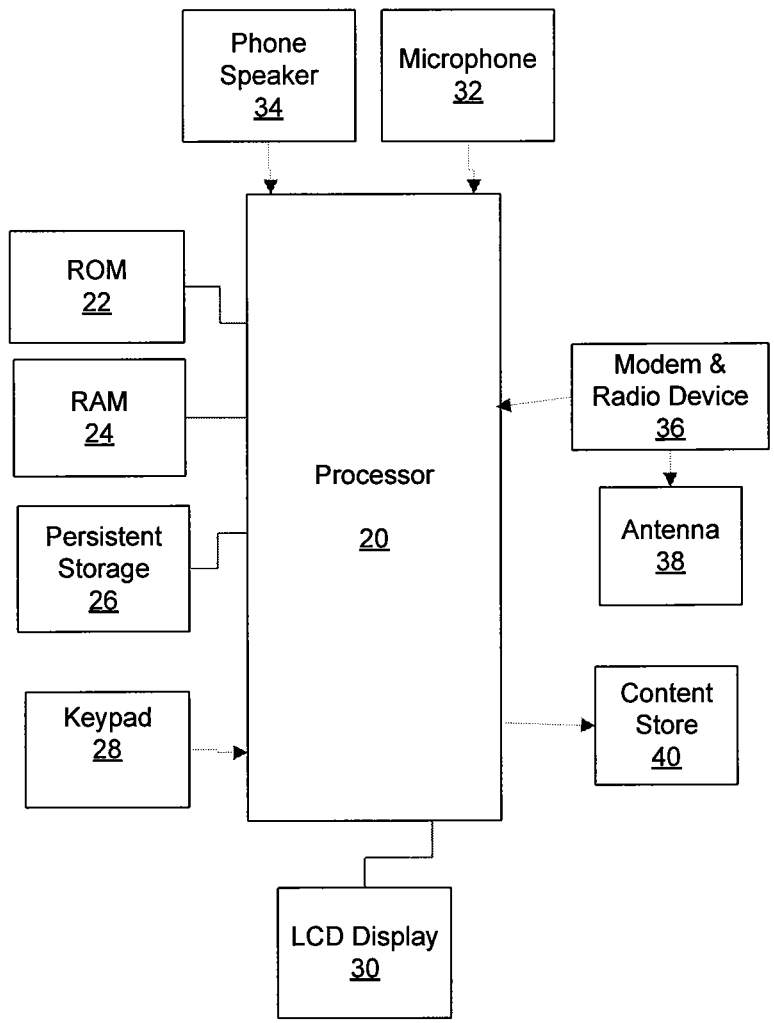
FIG. 2 is a block diagram of components of a portable electronic device according to an embodiment.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 is based on a microcomputer including a processor 20 connected to a read-only-memory (ROM) 22 that contains a plurality of applications executable by the processor 20 that enables each portable electronic device 12 to perform certain functions including, for example, PIN message functions, SMS message functions and cellular telephone functions. The processor 20 is also connected to a random access memory unit (RAM) 24 and a persistent storage device 26 which are responsible for various non-volatile storage functions of the portable electronic device 12. The processor 20 receives input from various input devices including a keypad 28. The processor 20 outputs to various output devices including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the portable electronic device 12, is also provided.

Request/view functionality for an attachment of an email message received by the portable electronic device 12 is provided by the Attachment Viewer and the Attachment Server. The Attachment Viewer, which is an application that is run by the processor 20 of the portable electronic device 12, displays images that correspond to attachments.

Figure 3:
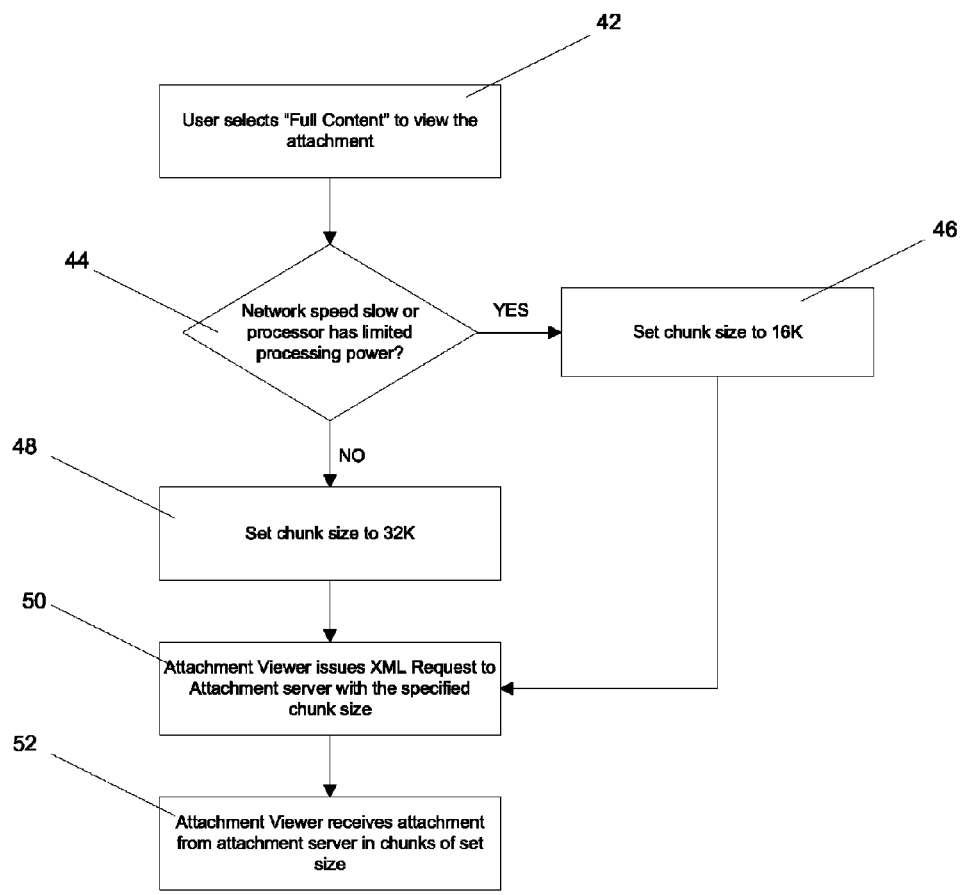
FIG. 3 is a flowchart showing device-side operation of a method for downloading data to an Attachment Viewer of the portable electronic device of FIG. 2.

Referring to FIG. 3, device-side operation of a method for requesting and viewing attachments on the portable electronic device 12 is generally shown. In order to view an attachment that is received in an email message, a user first opens the attachment in order to launch the Attachment Viewer. The user then selects "Full Content" from an Attachment Viewer menu, as indicated at step 42, in order to view the complete attachment. Before the "Full Content" request is relayed to the Attachment Server 18, the Attachment Viewer determines the type of network on which the portable electronic device 12 is currently operating, as indicated at step 44.

Wireless networks are categorized into two groups by the portable electronic device 12: fast networks and slow networks. Fast networks include: EDGE (Enhanced Data GSM Environment), EVDO (Evolution-Data Optimized), HSDPA (High Speed Downlink Packet Service) and UMTS (Universal Mobile Telecommunications System) Networks, for example. Slow Networks include: GPRS (General Packet Radio Service), CDPD (Cellular Digital Packet Data), TDMA (Time Division Multiple Access), iDEN, Mobitex, and DataTAC, for example. Each category of network speed has a corresponding default chunk size for downloading data to the portable electronic device 12 associated therewith. If the network is a slow network, the Attachment Viewer sets the chunk size for receiving streamed data to 16 Kilobytes (K), as indicated at step 46. If the network is a fast network, the Attachment Viewer sets the chunk size to 32K, as indicated at step 48.

Device processor speed and device memory also contribute to the determination of network category. Since greater processing power is required to process and display larger data chunks, a device having limited processing power will be placed in the slow network category regardless of the speed of the actual network on which the device is operating.

Once the chunk size for downloading the attachment has been determined, the Attachment Viewer of the portable electronic device 12 sends an XML (Extensible Mark-Up Language) request to the Attachment Server 18, as indicated at step 50. In the request, the chunk size is indicated by <CS> or <XCS> tags. For example the string: "<CS>32000<CS>" indicates that the chunk size being requested by the Attachment Viewer is 32K. The request is then processed by the Attachment Server 18 and the attachment is downloaded in chunks having the specified chunk size to the Attachment Viewer, as indicated at step 52. The downloaded attachment is then viewable by the user in the Attachment Viewer.

Figure 4:
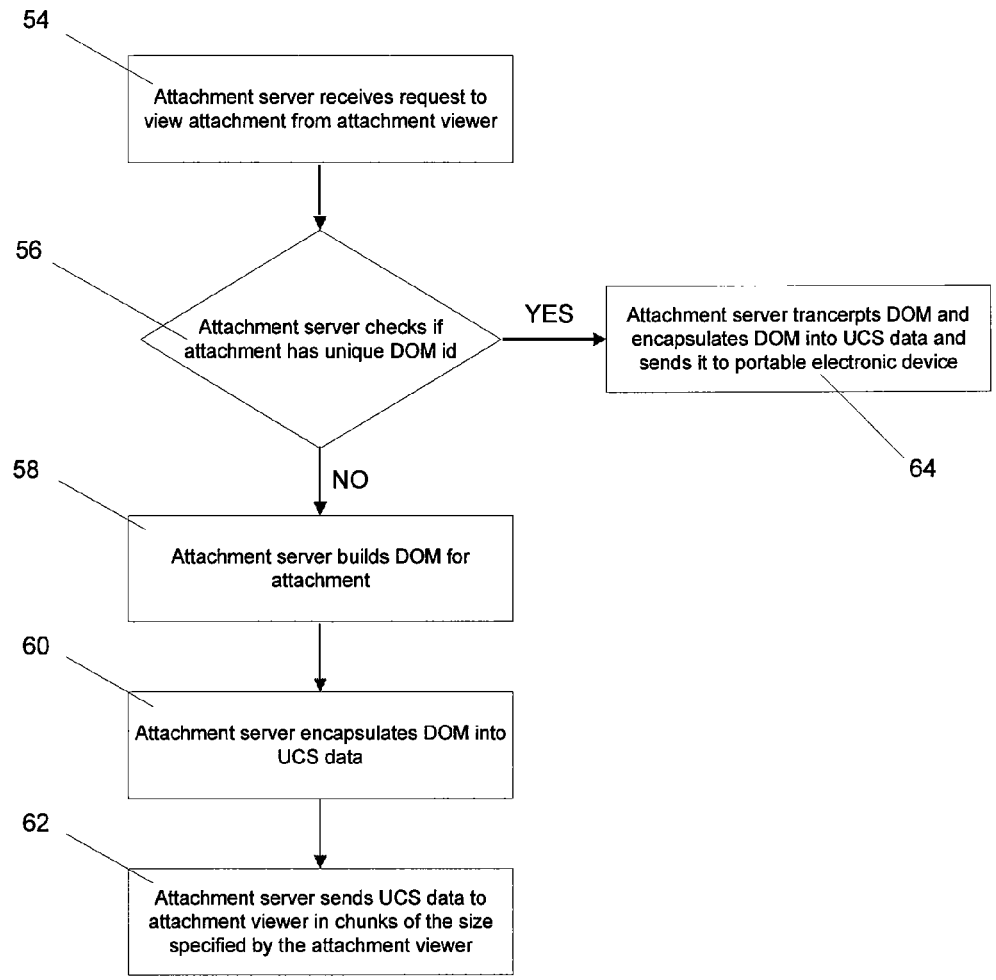
FIG. 4 is a flowchart showing server-side operation of a method for downloading data to an Attachment Viewer of the portable electronic device of FIG. 2.

In order to preserve the integrity of the request even if a device 12 switches from a slower network to a faster network or vice versa, the original chunk size that is requested will be preserved to ensure no re-pagination is required. Subsequent attachment download requests, however, will reflect the different network type Referring to FIG. 4, server-side operation of the method for requesting and viewing attachments on the portable electronic device 12 is generally shown. At step 54, which corresponds to step 50 of FIG. 3, the Attachment Server 18 receives a request from the Attachment Viewer to view an attachment that was received with an email message. Upon receipt of this request, the Attachment Server 18 first determines if the attachment has a unique Document Object Model (DOM) id, as indicated at step 56. If so, this indicates that the attachment has been previously viewed and may be retrieved from the Attachment Server 18. If the DOM was recently viewed, it is retrieved from server cache, alternatively, the DOM is retrieved from a document database on the Attachment Server 18. The Attachment Server 18 then transcripts the DOM and encapsulates the DOM into Universal Content Stream (UCS) data, which is a format that is readable by the Attachment Viewer, and sends the UCS data to the portable electronic device 12, as indicated in step 64. The transcription process generally includes preparing the DOM for transmission to the portable electronic device 12 and is described in U.S. patent application Ser. No. 2002/0161796, which is herein incorporated by reference.

If the attachment has not been previously viewed, the Attachment Server 18 builds a DOM that represents the attachment by parsing the attachment document (step 58). In this manner, a graph structure is built within the Attachment Server representing a map of the original attachment file. The DOM contains textual content, font, style and formatting attributes as well as layout attributes, such as page/slide size, positioning information (ie. x, y and z coordinates on the page), embedded graphics and tables, for example. DOM structure is well known and is disclosed in U.S. patent application Ser. No. 2006/0055693, which is herein incorporated by reference.

Once the DOM of the attachment is built, the Attachment Server 18 transcripts the DOM and then encapsulates the DOM in UCS data, as indicated at step 60. The UCS data is then sent to the portable electronic device 12 in chunks, as indicated at step 62. The size of the chunks that are sent corresponds to the size that was provided in the request from the portable electronic device 12 (step 54).

In operation, when a user selects to view an attachment that was received by the portable electronic device 12 in an email message, a request including a network speed-determined chunk size is sent to the Attachment Server 18. In response to this request, the attachment is downloaded to the portable electronic device 12 in chunks of the requested size. As the chunks are received by the portable electronic device 12, attachment content is displayed on the display screen 30. By sending data in chunks having a size that is determined based on network speed, the downloading process is optimized and the user is able to view attachments in an efficient manner.

It will be appreciated by a person skilled in the art that the default chunk sizes are not limited to 16K and 32K. Different default chunk sizes could be set. Further, more than two default chunk sizes could be provided. For example, an even faster network speed category having a default chunk size of 64K may be provided.

The method for downloading data to a portable electronic device 12 is not limited to downloading attachment data from an Attachment Server. Email body text, for example, may be downloaded from a Mail Server to the portable electronic device 12 in chunks that have a set size that is determined based on the network speed. Similarly, native attachment downloads, which send attachment binary data from an Enterprise Server rather than UCS data from the Attachment Server, may be performed with a set chunk size that is determined based on the network speed. Native attachment download is useful for portable electronic devices having Microsoft Office™-type programs available. Such programs are capable of displaying .doc and .ppt files, for example, using the appropriate Office-type program on the portable electronic device.

A specific embodiment has been shown and described herein. However, modifications and variations may occur to those skilled in the art. All such modifications and variations are believed to be within the sphere and scope of the present embodiment.

The invention claimed is:

1. A method for downloading data from a server to a portable electronic device comprising a processor and a memory, said method comprising:
   determining a network speed of a wireless network on which said portable electronic device is operating;
   setting, at said portable electronic device, a variable data chunk size, said variable data chunk size being determined based on said network speed and based on said processor, wherein said variable data chunk size is set larger when a category of network speed is faster, wherein said variable data chunk size is set smaller when a category of network speed is slower, and wherein said variable data chunk size is set smaller when said processor is of limited processing power regardless of said category of network speed;
   sending a request to said server including said variable data chunk size; and
   receiving said data from said server in chunks having said variable data chunk size, said data including a graph structure representing a map of said data, wherein said graph structure is a Document Object Model.

2. A method as claimed in claim 1, wherein said variable data chunk size is set to 16K when said wireless network is a GPRS network.

3. A method as claimed in claim 1, wherein said variable data chunk size is set to 32K when said wireless network is selected from the group consisting of: EDGE, EVDO and UMTS.

4. A method as claimed in claim 1, wherein said data is Universal Content Stream data corresponding to an attachment sent to said portable electronic device in an email message.

5. A method as claimed in claim 1, wherein said data is attachment binary data corresponding to an attachment sent to said portable electronic device in an email message.

6. A method as claimed in claim 4, wherein said request is sent to said server in response to an attachment viewer of said portable electronic device attempting to display said attachment.

7. A method as claimed in claim 1, wherein said request includes a <CS> tag.

8. A method as claimed in claim 1, wherein said variable data chunk size is determined based on a capacity of said memory.

9. A method for requesting and viewing an attachment of an email message in an attachment viewer of a portable electronic device comprising a processor and a memory, said method comprising:
   sending a request from said portable electronic device to an attachment server in order to view said attachment in said attachment viewer, said request including a variable data chunk size for receiving said attachment;
   building a graph structure within said attachment server representing a map of said attachment and encapsulating said graph structure in an attachment viewer readable format, wherein said graph structure is a Document Object Model; and
   sending said attachment in said attachment viewer readable format from said attachment server to said portable electronic device, said attachment being received in chunks having said variable data chunk size;
   wherein said variable data chunk size is determined based on a speed of a wireless network on which said portable electronic device is operating and based on said processor, wherein said variable data chunk size is set larger when a category of network speed is faster, wherein said variable data chunk size is set smaller when a category of network speed is slower, and wherein said variable data chunk size is set smaller when said processor is of limited processing power regardless of said category of network speed.

10. A method as claimed in claim 9, wherein said variable data chunk size is 16K when said wireless network is a GPRS network.

11. A method as claimed in claim 9, wherein said variable data chunk size is 32K when said wireless network is selected from the group consisting of: EDGE, EVDO, HSDPA and UMTS.

12. A method as claimed in claim 10, wherein said attachment viewer readable format is Universal Content Stream format.

13. A method as claimed in claim 9, wherein said variable data chunk size is determined based on a capacity of said memory.

14. A portable electronic device operating on a wireless network, said portable electronic device comprising:
   a memory for storing an attachment viewer; and
   a processor configured to execute said attachment viewer to request to view an attachment and to provide a variable data chunk size for receiving said attachment; said attachment viewer in communication with an attachment server for receiving data in chunks, said data including a graph structure representing a map of said data,
   wherein said graph structure is a Document Object Model, and
   wherein said variable data chunk size is determined based on a speed of said wireless network and based on said processor, wherein said variable data chunk size is set larger when a category of network speed is faster, wherein said variable data chunk size is set smaller when a category of network speed is slower, and wherein said variable data chunk size is set smaller when said processor is of limited processing power regardless of said category of network speed.

15. A portable electronic device as claimed in claim 14, wherein said variable data chunk size is 16K when said wireless network is a GPRS network.

16. A portable electronic device as claimed in claim 14, wherein said variable data chunk size is 32K when said wireless network is selected from the group consisting of: EDGE, EVDO, HSDPA and UMTS.

17. A portable electronic device as claimed in claim 14, wherein said variable data chunk size is determined based on a capacity of said memory.

* * * * *

UNITED STATES PATENT AND TRADEMARK OFFICE
CERTIFICATE OF CORRECTION

PATENT NO. : 8,942,182 B2  Page 1 of 1
APPLICATION NO. : 11/562118
DATED : January 27, 2015
INVENTOR(S) : Dan Dumitru, Rakesh Arora and Eshwar Stalin It is certified that error appears in the above-identified patent and that said Letters Patent is hereby corrected as shown below:

Title page item (75), (Inventors), Line 1, Delete "Altanta," and insert -- Atlanta, --, therefor.

In the Claims,

Column 5, Line 32, In Claim 2, delete "A method" and insert -- The method --, therefor.
Column 5, Line 35, In Claim 3, delete "A method" and insert -- The method --, therefor.
Column 5, Line 39, In Claim 4, delete "A method" and insert -- The method --, therefor.
Column 5, Line 42, In Claim 5, delete "A method" and insert -- The method --, therefor.
Column 5, Line 46, In Claim 6, delete "A method" and insert -- The method --, therefor.
Column 5, Line 50, In Claim 7, delete "A method" and insert -- The method --, therefor.
Column 5, Line 52, In Claim 8, delete "A method" and insert -- The method --, therefor.
Column 6, Line 18, In Claim 10, delete "A method" and insert -- The method --, therefor.
Column 6, Line 21, In Claim 11, delete "A method" and insert -- The method --, therefor.
Column 6, Line 26, In Claim 12, delete "A method" and insert -- The method --, therefor.
Column 6, Line 26, In Claim 12, delete "claim 10," and insert -- claim 9, --, therefor.
Column 6, Line 29, In Claim 13, delete "A method" and insert -- The method --, therefor.
Column 6, Line 53, In Claim 15, delete "A portable" and insert -- The portable --, therefor.
Column 6, Line 57, In Claim 16, delete "A portable" and insert -- The portable --, therefor.
Column 6, Line 61, In Claim 17, delete "A portable" and insert -- The portable --, therefor.

Signed and Sealed this
Ninth Day of June, 2015

Michelle K. Lee
*Director of the United States Patent and Trademark Office*